United States Patent [19]

Kawahara

[11] Patent Number: 5,325,149
[45] Date of Patent: Jun. 28, 1994

[54] CAMERA SYSTEM WITH INTERCHANGEABLE LENS

[75] Inventor: Hideo Kawahara, Hatogaya, Japan
[73] Assignee: Canon Kabushiki Kaisha, Tokyo, Japan
[21] Appl. No.: 147,020
[22] Filed: Nov. 3, 1993

Related U.S. Application Data

[63] Continuation of Ser. No. 75,865, Jun. 11, 1993, which is a continuation of Ser. No. 818,171, Jan. 8, 1992, abandoned.

[30] Foreign Application Priority Data

Jan. 11, 1991 [JP] Japan ................................. 3-002243

[51] Int. Cl.$^5$ ................................................. G03B 7/08
[52] U.S. Cl. .................................. 354/446; 354/286; 348/363
[58] Field of Search ............... 354/446, 451, 452, 286; 358/225, 228

[56] References Cited

U.S. PATENT DOCUMENTS

| | | | |
|---|---|---|---|
| 4,860,113 | 8/1989 | Miyamoto et al. | 354/286 |
| 4,959,728 | 9/1990 | Takahashi et al. | 354/286 |
| 4,967,281 | 10/1990 | Takada | 358/225 |
| 5,168,365 | 12/1992 | Kawahara | 358/228 |

Primary Examiner—Russell E. Adams
Attorney, Agent, or Firm—Robin, Blecker, Daley & Driscoll

[57] ABSTRACT

A camera system with interchangeable lens, consisting of a camera unit and a lens unit detachably mountable on the camera unit, comprising a target value setting circuit for setting a target control value of a diaphragm provided in the lens unit, a correction circuit for generating a correction signal for varying the content of the target value setting circuit, a diaphragm state detection circuit for detecting the diaphragm information, a first control circuit for varying the set value of the target value setting circuit, based on the correction signal, a diaphragm drive circuit for driving the diaphragm according the result of comparison of the output of the diaphragm state detection circuit and the value of the target value setting circuit, a memory circuit for storing the information specific to each lens unit, and a second control circuit for generating, at the detaching and mounting of the lens unit, a command for controlling the value of the target value setting circuit for bringing the diaphragm to a predetermined state, by referring to the content of the memory circuit.

21 Claims, 8 Drawing Sheets

CAMERA SYSTEM WITH INTERCHANGEABLE LENS

This is a continuation application under 37 CFR 1.62 of prior application Ser. No. 08/075,865, filed Jun. 11, 1993, which is a continuation of Ser. No. 818,171 filed Jan. 8, 1992, now abandoned.

BACKGROUND OF THE INVENTION

1. Field of the Invention

The present invention relates to a camera system with interchangeable lenses, and more particularly such camera system including so-called electronic mount system for effecting communication of data required for various controls between a lens unit and a camera unit.

2. Related Background Art

The interchangeable lens system conventionally employed in ordinary still cameras is being introduced into so-called camcorders, with the recent progress in VTR and other imaging equipment. In employing such interchangeable lens system in the VTR or other similar equipment, the transmission of information can be conducted with an exposure state control signal that is so normalized and encoded as to sufficiently ensure the compatibility of lens control information, whereby the exposure control can be achieved, different from the conventional interchangeable lens system, in the same manner as in the fixed-lens camcorder.

Figure 1:
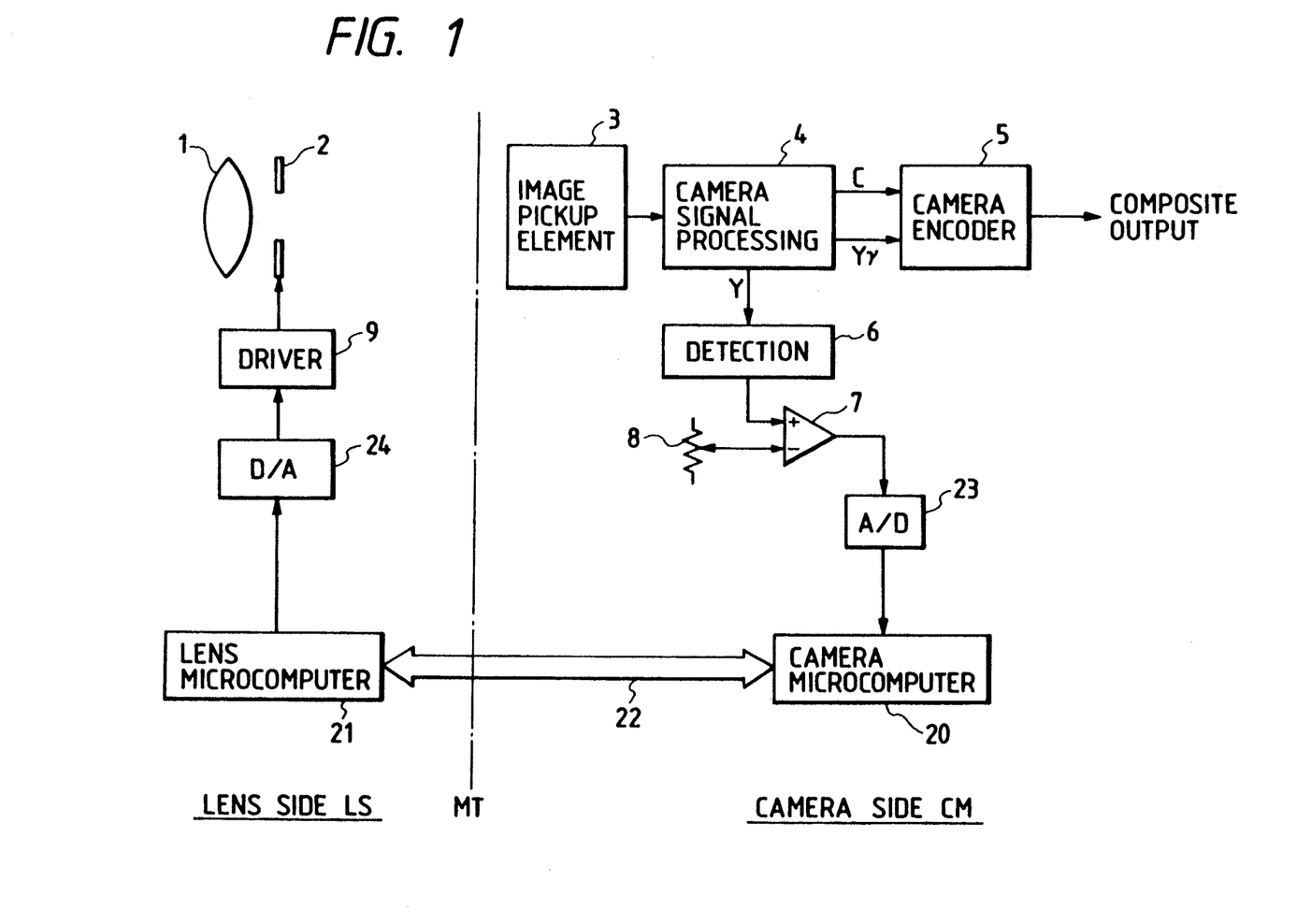
FIG. 1 is a block diagram of an example of the conventional automatic exposure control device.

FIG. 1 is a block diagram showing an example of the exposure control device in a conventional interchangeable-lens video camera system.

A chain line in the center indicates a mount portion MT, and a camera unit CM and a lens unit LS are respectively indicated at the right and at the left.

An object image formed on an imaging face of an image pickup device 3, through a lens optical system 1 and a diaphragm 2 is subjected to photoelectric conversion in the image pickup device 3 and is released as an image signal, which is supplied to a camera signal processing circuit 4. The circuit 4 effects for example γ-conversion and obtains a color signal C and a luminance signal Yγ, which are converted into a composite image signal through a camera encoder 5 for example of NTSC format.

Also the luminance signal Y released from said camera signal processing circuit 4 prior to γ-conversion is supplied to a detection circuit 6 and is for example integration detected for generating a control signal for controlling the diaphragm 2 in order to obtain an appropriate exposure according to the brightness of the object field.

The detection output signal from said detection circuit 6 is compared with a reference value 8 in a comparator 7, which thus calculates a difference signal. The difference signal is converted into digital data by an A/D converter 23, and is fetched in a microcomputer 20 of the camera side, then transmitted as a diaphragm control signal to a microcomputer 21 of the lens side, through a communication line 22 by predetermined communication means to be explained later.

In response, said microcomputer 21 in the lens unit LS calculates a signal representing the diaphragm control amount, which is converted into an analog signal by a D/A converter 24 and supplied to a diaphragm driver 9 for controlling the diaphragm 2.

Figure 2:
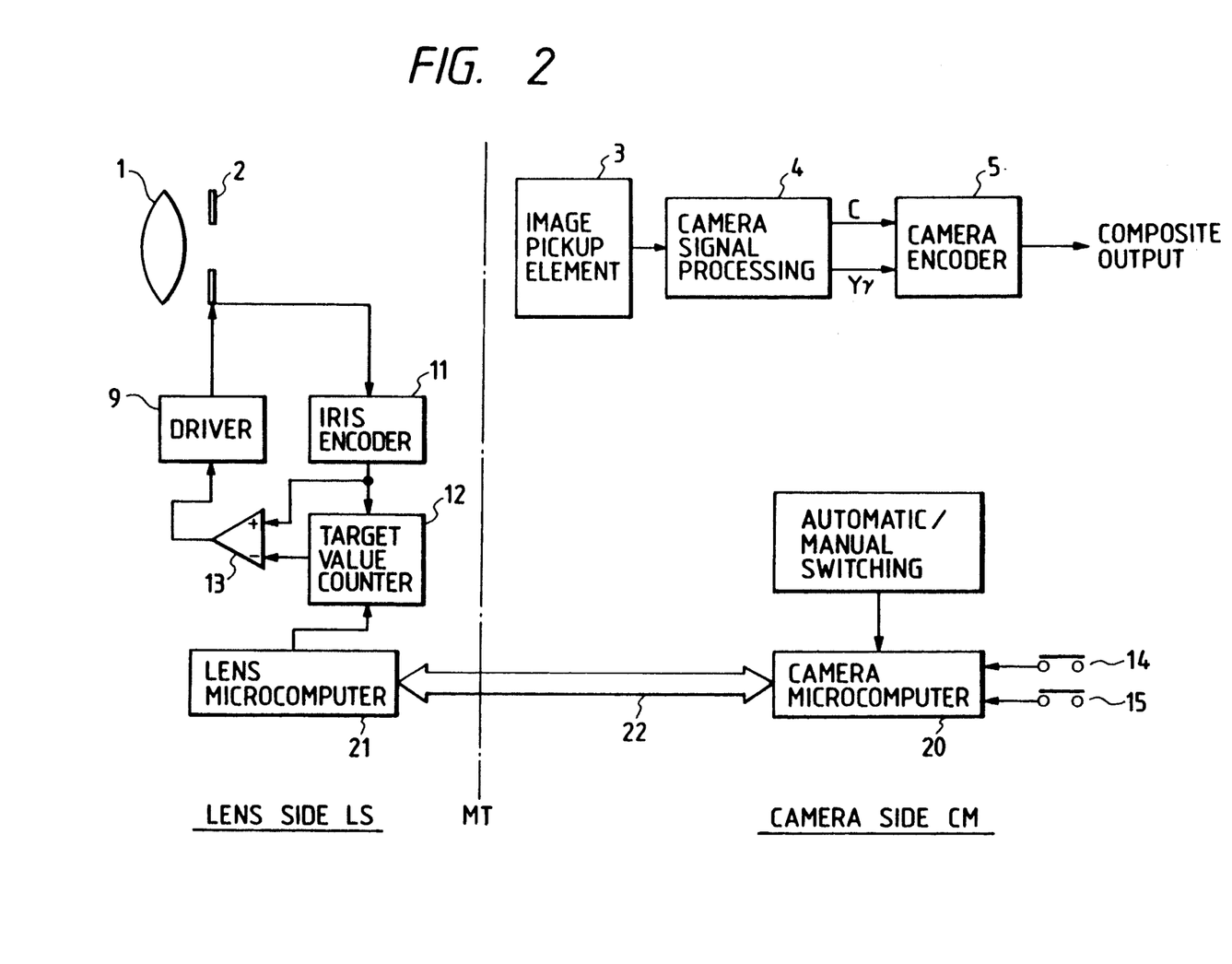
FIG. 2 is a block diagram of an example of the conventional manual exposure control device.

FIG. 2 is a block diagram showing a manual exposure control device for an interchangeable-lens video camera system, wherein same components as those in FIG. 1 are represented by same numbers and will not be explained further. When an external input for effecting manual exposure control is given to the microcomputer 20 of the camera side, the status of such manual exposure control is transmitted to the microcomputer 21 of the lens side through the communication line 21.

In the lens unit LS in such a manual exposure control state, the value of a diaphragm encoder 11 is stored in a target value counter 12. The diaphragm control signal calculated by the lens microcomputer 21 is supplied to said target value counter 12 and added to the value of the diaphragm encoder stored therein. The sum obtained in the target value counter is compared with the value of the diaphragm encoder 11 by a comparator 13, and the driver 9 is activated according to result of said comparison, thereby controlling the diaphragm in such a manner that the value of the target value counter 12 becomes equal to that of the diaphragm encoder.

Thus, when an aperture opening switch 14 or an aperture closing switch 15 is actuated, the camera microcomputer 20 calculates the diaphragm control amount, which is transmitted through the communication line 22 to the lens microcomputer 21 and varies the value of the target value counter by a predetermined amount according to the actuation. The change in the value of the target value counter allows to vary the actual diaphragm aperture, through the operations explained above.

In such a device, however, when the lens is changed in the manual exposure control state, and if the target value counter of the newly mounted lens unit contains data at the previous use or erroneous data, it becomes impossible to control the diaphragm aperture to the target value prior to the lens change.

SUMMARY OF THE INVENTION

An object of the present invention is to resolve the above-mentioned drawbacks of the prior art.

Another object of the present invention is to provide a camera adapted for use in a camera system with interchangeable lens.

Still another object of the present invention is to provide an exposure control device adapted for use in a camera system with interchangeable lens.

The above-mentioned objects can be attained, according to a preferred embodiment, by an interchangeable-lens camera system consisting of a camera unit and a lens unit detachably mountable on the camera unit, comprising in the lens unit, target value setting means for setting a control target value for the diaphragm; correction means for generating a correction signal for varying the content of the target value setting means; diaphragm state detection means for detecting diaphragm information; first control means for varying the set value of the target value setting means according to the correction signal; diaphragm drive means for driving the diaphragm according to information obtained by the comparison of the output of .the diaphragm state detection means with the value of the target value setting means; memory means for storing information specific to each lens unit; and second control means for generating a command for controlling the value of the target value setting means in order to bring the diaphragm to a predetermined state, at the mounting or detaching of the lens unit, by referring to the content of the memory means.

Still another object of the present invention is to provide a camera system with interchangeable lens consisting of a camera unit and a lens unit detachably mountable on the camera unit, comprising in the lens unit, target value setting means for setting a diaphragm target value; correction means for generating a correction signal for increasing or decreasing the content of the target value setting means; diaphragm state detection means for detecting diaphragm information; first control means for varying the set value of the target value setting means according to the correction signal; diaphragm drive means for driving the diaphragm according to the information obtained by the comparison of the output of the diaphragm state detection means and the value of the target value setting means; and second control means for generating a command for controlling the value of the target value setting means in order to bring the diaphragm to a predetermined state, when a change occurs in the state of power supply.

Still another object of the present invention is to provide a camera unit, capable of detachably mounting a lens unit, comprising a first memory unit for storing the state of the diaphragm in a lens unit; second memory means for storing lens information specific to the lens unit; comparator means for comparing when the lens unit is changed, the lens information of a newly mounted lens unit with the content of the second memory means; and control means for generating a command for controlling the diaphragm to the aperture value stored in the first memory means, according to the output of the comparator means.

Still another object of the present invention is to provide a camera unit, capable of detachably mounting a lens unit, comprising first memory means for storing the state of the diaphragm in the lens unit; and control means for generating a command for controlling the diaphragm to an aperture value stored in said first memory means when a change occurs in the state of power supply.

Still another object of the present invention is to provide an exposure control device capable, in a manual diaphragm control mode, of smooth diaphragm control operation without error, so as to bring the diaphragm to a predetermined aperture value at the change of the lens or at the start of power supply.

Still other objects of the present invention, and the advantages thereof, will become fully apparent from the following description, which is to be taken in conjunction with the attached drawings.

DETAILED DESCRIPTION OF THE PREFERRED EMBODIMENTS

Figure 3:
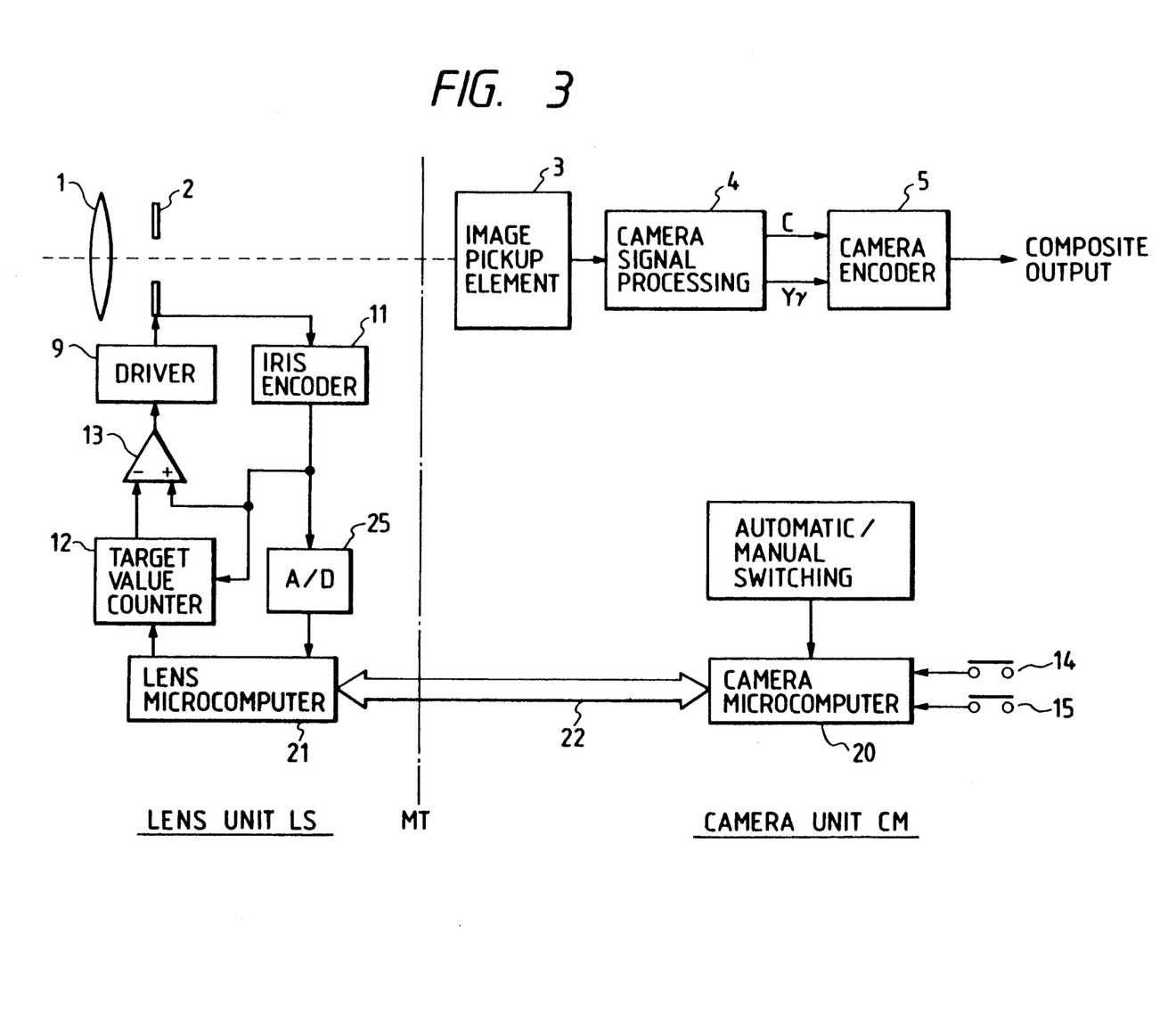
FIG. 3 is a block diagram of an embodiment of the present invention.

FIG. 3 is a block diagram of a camera system with interchangeable lens, constituting a first embodiment of the present invention. In FIG. 3, same components as those in the above-explained conventional configurations are represented by same numbers, and the automatic exposure control operation in the present embodiment will not explained since it is the same as that in the above-explained conventional configurations.

A chain line in the center stands for a mount portion MT, and a camera unit CM and a lens unit LS are respectively provided at the right and at the left.

An object image formed on an imaging face of an image pickup device 3, through a lens optical system 1 and a diaphragm 2, is photoelectrically converted into an output image signal by the device 3. A camera signal processing circuit 4 effects for example a $\gamma$-transformation on the image signal to obtain a color signal C and a luminance signal $Y\gamma$, which are converted by a camera encoder 5 for example of NTSC format into a composite image signal.

In the following, the manual exposure control is explained. The method of controlling the diaphragm by increasing or decreasing the value of the target value counter 12 through the manipulation of a diaphragm opening switch 14 and a diaphragm closing switch 15 is same as that in the aforementioned conventional configurations.

In the lens unit, the diaphragm aperture value obtained from the diaphragm encoder 11 is converted by an A/D converter 25 into digital data, which are converted, together with a lens number specific to each lens, into serial control information of a predetermined format by the lens microcomputer 21, and transmitted to the camera microcomputer 20 through the communication line 22.

The camera microcomputer 20, provided with a memory area for storing the information such as the lens number, diaphragm aperture value etc., transmitted from the lens unit, compares the lens number transmitted from the lens unit with that stored in the memory. Coincidence of the lens numbers indicates that the same lens is mounted again even if the detachment and attachment of lens are conducted. Consequently the state of the diaphragm is considered to have remained the same as in the previous detachment of the lens, or namely the target diaphragm value is the same as before the detachment of the lens, and the manual diaphragm control is executed without correction of the target diaphragm value. The diaphragm control operation itself is same as that explained before.

If both lens numbers do not mutually coincide, the lens unit is considered to have been changed to another lens unit. Thus the value of the target diaphragm counter, or the diaphragm drive state, of the newly mounted lens unit is considered different from the diaphragm aperture value stored in the camera microcomputer 20, and the target value in the counter 12 of said lens unit is corrected by the transmission of a diaphragm closing or opening command to the lens unit until the value of the diaphragm encoder transmitted from the lens unit becomes equal to the value stored in the camera microcomputer 20. The correct diaphragm control is thereafter enabled.

In the following there will be explained the control sequence of the camera unit embodying the present invention, in the manual exposure control, with reference to a flow chart shown in FIG. 4.

At first, when the camera unit is activated, a step C1 awaits the entry of a synchronization signal VSYNC of the video camera.

Upon receiving the VSYNC signal in the step C1, a step C2 generates a chip select signal CS.

Then a step C3 executes communication of control information between the camera microcomputer 20 in the camera unit and the lens microcomputer 21 in the lens unit.

After the completion of the communication between the camera and the lens, a step C4 resets the CS signal.

Then a step C5 discriminates whether the stored lens unit number, previously transmitted from the lens unit coincides with the lens number currently transmitted from the lens unit.

If the step C5 identifies that both lens numbers mutually coincide, indicating that the lens unit has not been changed, a step C6 stored the information of the diaphragm encoder, transmitted from the lens unit, in the diaphragm aperture value memory area of the camera microcomputer 21, and the sequence proceeds to a step C7.

The step C7 discriminates whether any of exposure correction switches, namely either the diaphragm opening switch 14 or the diaphragm closing switch 15, is actuated.

If the step C7 identifies that either of said switches is actuated, a step C8 identifies which of said switches is actuated.

If the step C8 identifies the actuation of the diaphragm opening switch 14, a step C9 releases data of a manual opening mode for generating a command for opening the diaphragm, and the sequence then proceeds to a step C15 for storing the communication information to the lens unit.

On the other hand, if the step C8 identifies the actuation of the diaphragm closing switch 15, a step C10 releases data of a manual closing mode for generating a command for closing the diaphragm, and the sequence then proceeds to a step C15 for storing the communication information to the lens unit.

If the step C7 identifies that neither of the switches is actuated, the sequence proceeds to a step C11 for holding and releasing the current diaphragm control value, and the sequence then proceeds to the step C15 for storing the communication information to the lens unit.

Also if the lens numbers do not coincide with each other in the step C5, the sequence proceeds to a step C12 for discriminating whether the diaphragm aperture value stored in the memory area of the camera microcomputer 20 coincides with the diaphragm aperture value newly transmitted from the lens unit.

If both aperture values are mutually different in the step C12, a step C13 identifies the relation in the magnitude of the aperture value stored in the memory of the camera microcomputer and the current diaphragm aperture value.

If the step C12 identifies that the current aperture is smaller than the stored aperture, the sequence proceeds to the step C9 for assuming the manual opening mode as explained before. More specifically, a correction signal similar to that in the manual diaphragm correction is sent to the lens unit, thereby transmitting a diaphragm opening command in the step C15 until the value of the diaphragm encoder, transmitted from the lens unit, becomes equal to the value stored in the camera microcomputer 20. The target diaphragm value set in the counter 12 of the lens unit is thus corrected, and the exact diaphragm control is thereafter rendered possible.

Also if the step C13 identifies that the current aperture is larger than the aperture stored in the camera microcomputer 20, the sequence proceeds to the step C10 to close the diaphragm in a similar manner as in the step C9.

If the step C12 identifies that the current aperture value is equal to the stored aperture value, the lens number specific to the mounted lens unit is memorized, then a step C11 assumes the manual hold mode for holding the current diaphragm aperture value without correction, and the sequence then proceeds to the communication step C15.

The step C15 stores the data, generated in the foregoing steps C9-C11, for transmission to the lens unit. Then the sequence returns to the start, and the data are transmitted in the step C3 next time, to the lens unit.

Figure 5:
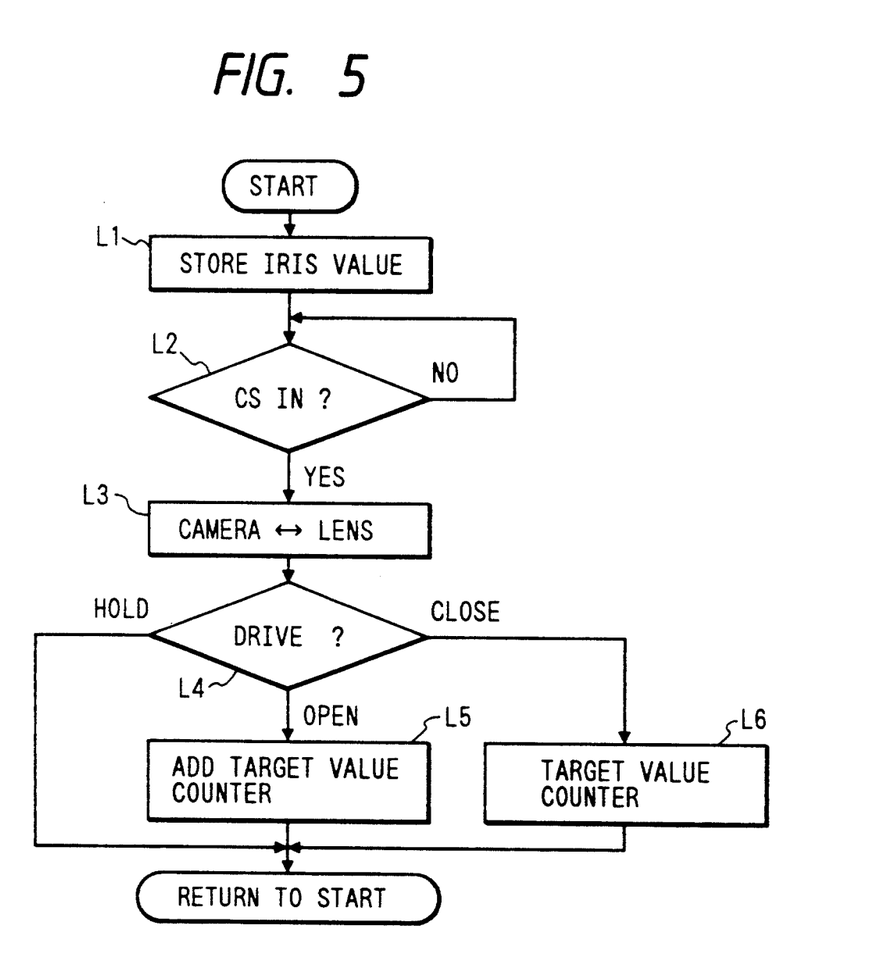
FIG. 5 is a flow chart showing the function of a lens unit embodying the present invention.

FIG. 5 is a flow chart showing the control sequence of the lens microcomputer 21 in the lens unit, in the manual exposure control in the present embodiment.

When the control operation in the lens side is initiated, a step L1 fetches the current diaphragm aperture value from the diaphragm encoder 11.

Then a step L2 awaits the entry of the chip select signal CS.

Upon reception of the chip select signal CS, a step L3 executes communication between the camera unit and the lens unit. In the communication, various control signals, including the diaphragm correction signal, are received from the camera unit.

A next step L4 discriminates the diaphragm control information from the camera, and identifies whether the communication, received from the camera in the step L3, has instructed the manual hold mode, manual opening mode or manual closing mode. If the manual hold mode has been instructed, the sequence returns to the start without diaphragm control.

If the step L4 identifies that the communication from the camera unit has instructed the manual opening mode, the sequence proceeds to a step L5 for adding the value of the target value counter 12 to the diaphragm control information from the camera, and returns to the start. In this manner the diaphragm is controlled in such a manner that the aperture thereof becomes equal to the target value newly set in the target value counter 12, and the manual diaphragm control operation explained before can thereafter be executed.

On the other hand, if the step L4 identifies that the communication from the camera unit has instructed the manual closing mode, the sequence proceeds to a step L6 for subtracting the value of the target value counter 12, and then returns to the start. In this manner the diaphragm is controlled in such a manner that the aperture thereof becomes equal to the target value newly set in the target value counter 12, and the manual diaphragm control operation explained before can thereafter be executed.

In the above-explained embodiment, it is assumed that the lens is changed in the course of communication control, but it is also necessary to match the diaphragm aperture value of the lens unit with the stored value of the camera unit when the power supply is once interrupted and started again, since the aperture value cannot be ensured in such a case. Such matching is particularly indispensable for a lens unit with a mechanism for closing the diaphragm when the power supply is cut off.

Figures 6, 6A:
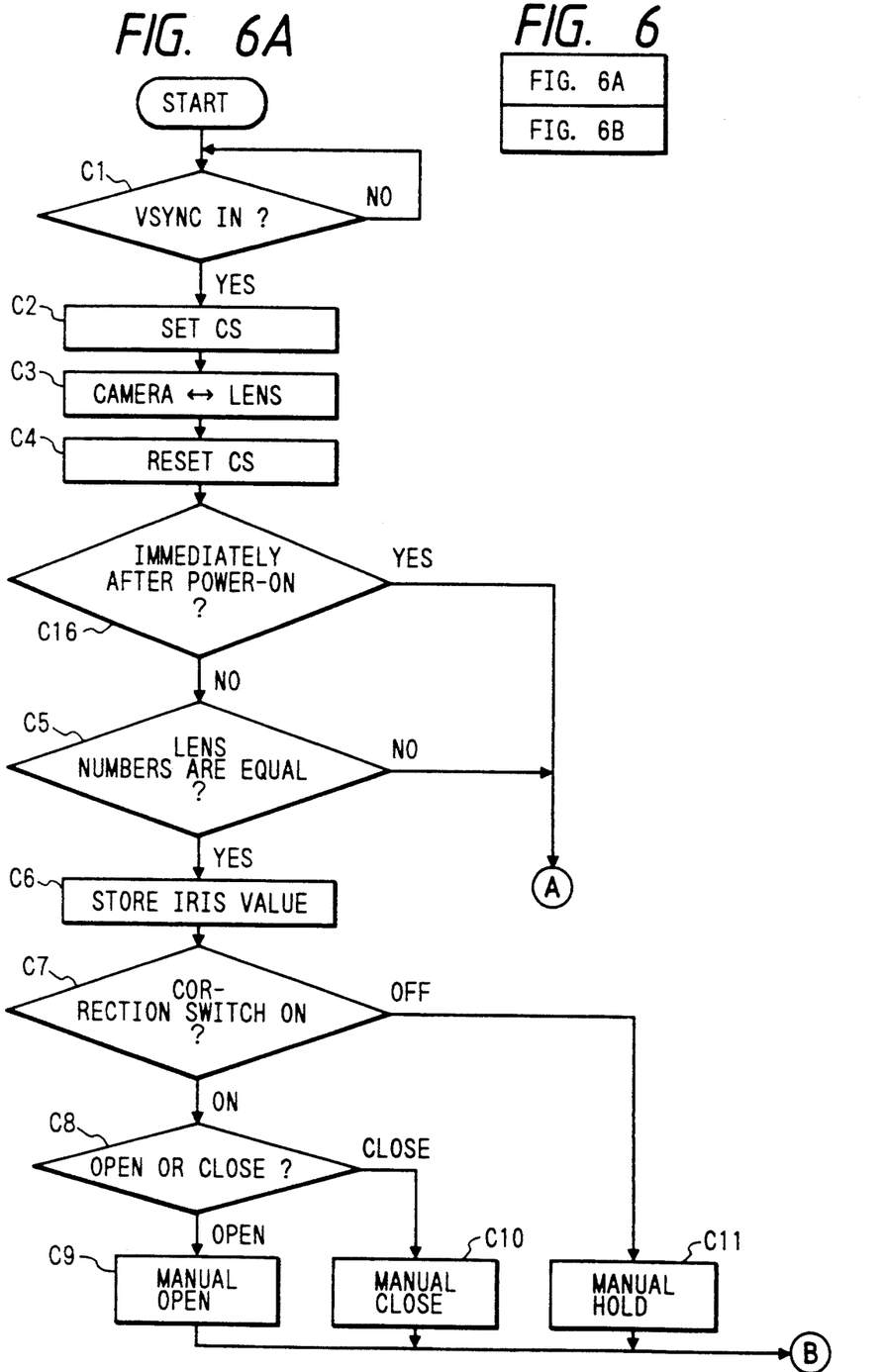
FIGS. 6, 6A and 6B are a flow chart showing the function of a camera unit constituting a second embodiment of the present invention.
Figure 6B:
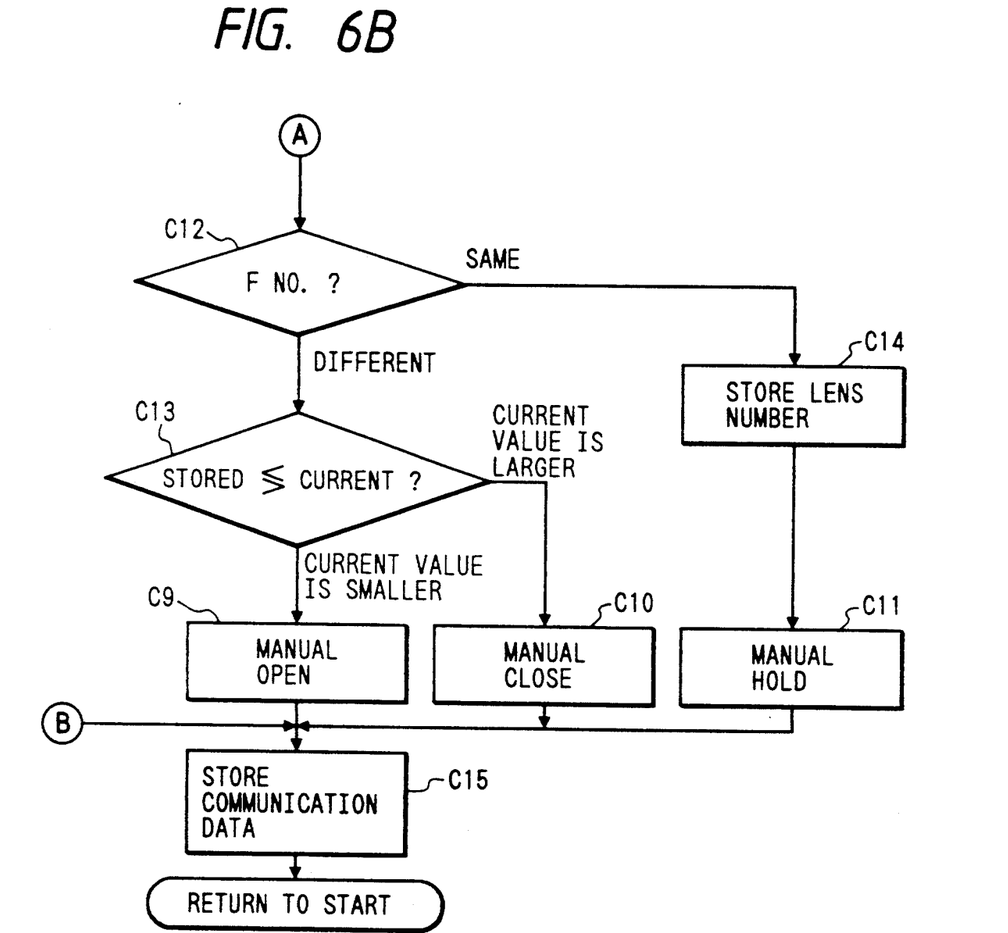

FIG. 6 is a flow chart of the control sequence of the camera microcomputer, which can also respond to such requirement.

Figures 4, 4A:
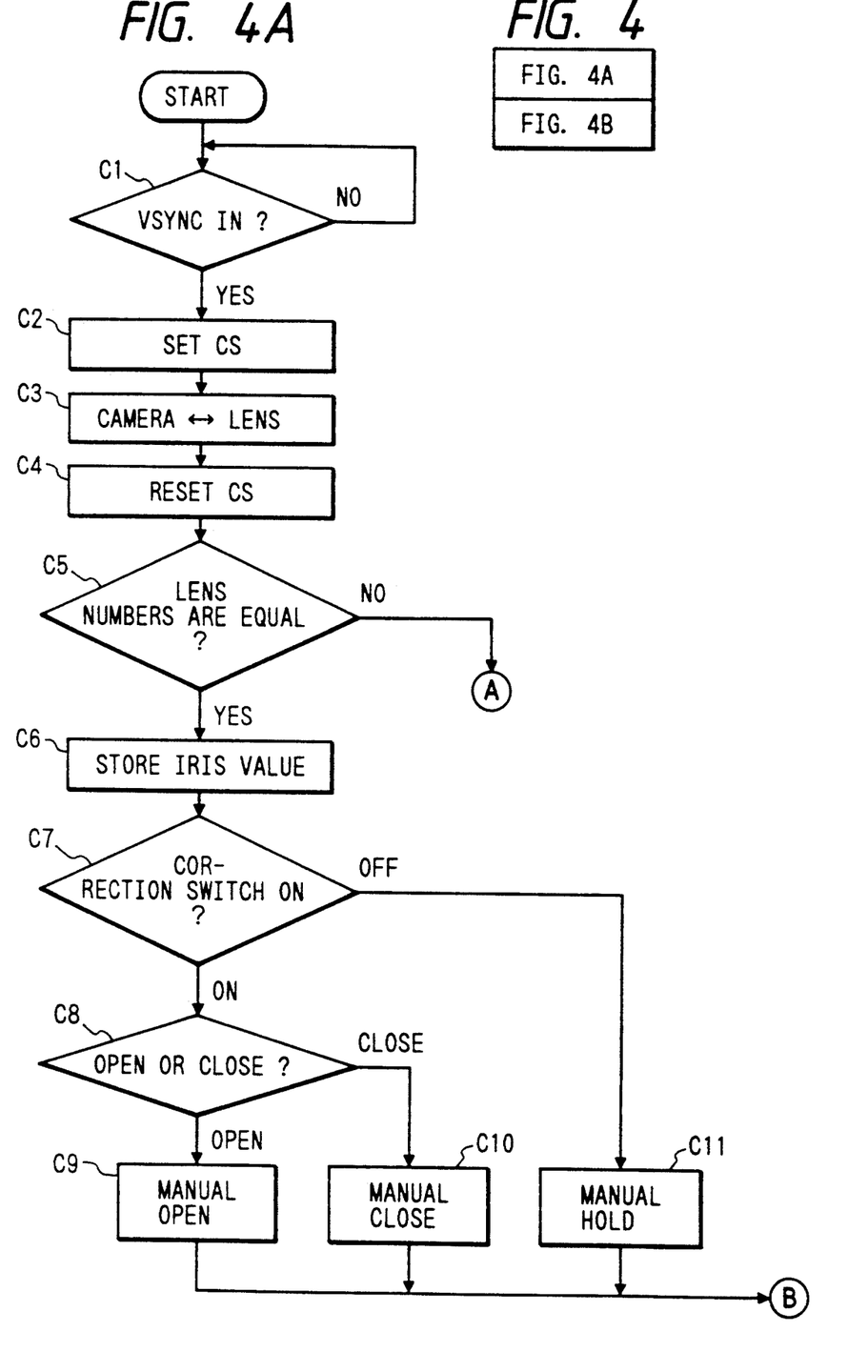
FIGS. 4, 4A and 4B are a flow chart showing the function of a camera unit embodying the present invention.
Figure 4B:
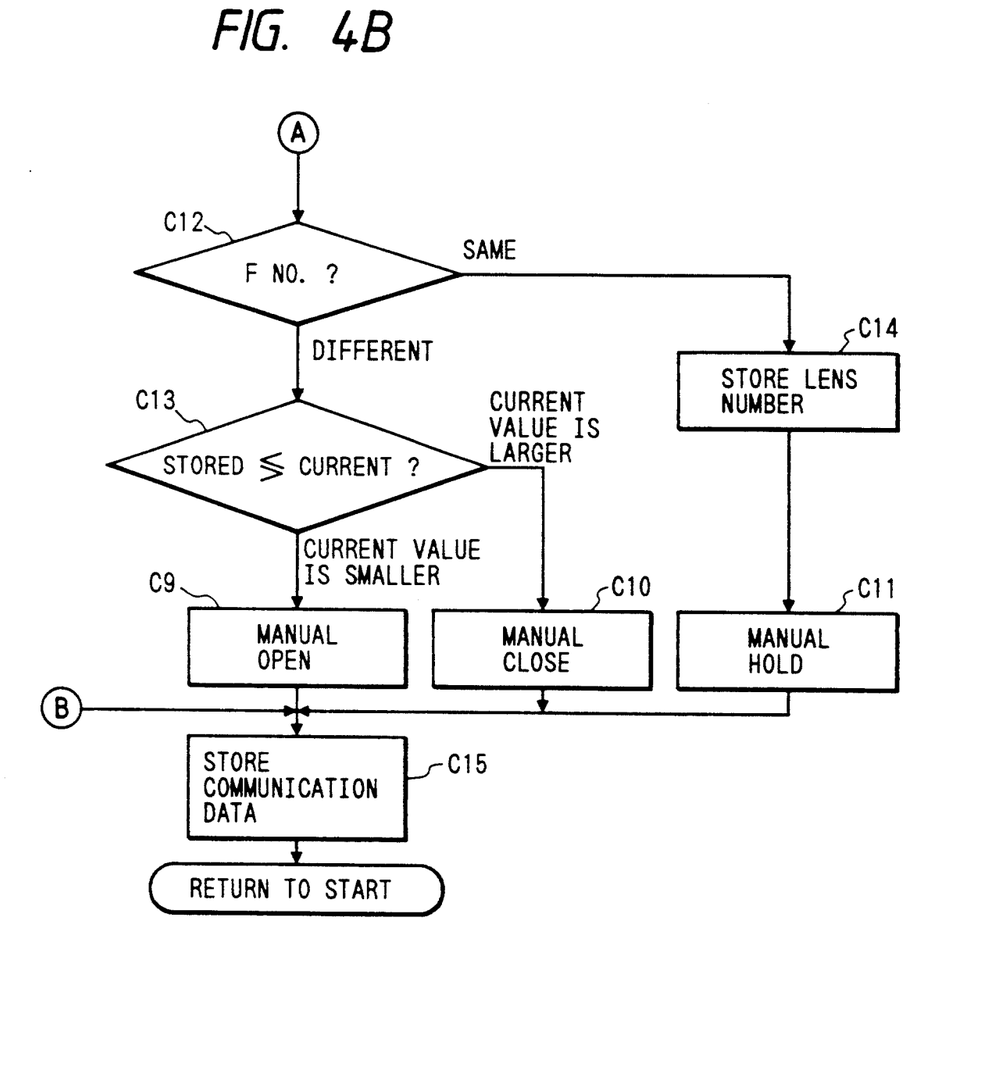

Said flow chart is different from that shown in FIG. 4, in the presence of a step C16 between the the steps C4 and C5. Thus, prior to the discrimination of coincidence of the lens numbers in the step C5, the step C16 discriminates whether the power supply has just been turned on, namely whether the power supply has been turned off and then on. If such off-on operation of the power supply has been conducted, the sequence proceeds to the step C5, but, if such off-on operation has not been conducted, the sequence proceeds to the step C12 without passing through the step C5.

The subsequent operation will not be explained as it is the same as explained before. Thus, if the power supply is once interrupted, the diaphragm aperture value of the lens unit is forcedly set at the aperture value stored in the camera unit, whereby the diaphragm control can always be conducted without error.

According to the present invention, in a video camera system with interchangeable lenses, when the lens is changed or the power supply is turned off and then on in the manual exposure control mode, the diaphragm of the lens is moved to the aperture in the preceding photo-taking operation, thereby arriving at the ordinary manual diaphragm control operation. It is therefore rendered possible to prevent drawbacks such as the image deterioration resulting from an abrupt change in the aperture or the errors in the diaphragm control in the initial state, and to avoid cumbersome aperture setting operation.

What is claimed is:

1. A camera system with interchangeable lenses, consisting of a camera unit and a lens unit detachably mountable on said camera unit, comprising:
   target value setting means provided in said lens unit for setting a target control value for a diaphragm;
   correction means for generating a correction signal for varying the content of said target value setting means;
   diaphragm state detection means for detecting diaphragm information;
   first control means for varying the set value of said target value setting means, based on said correction signal;
   diaphragm drive means for driving said diaphragm according to the result of comparison of the output value of said diaphragm state detection means and the value of said target value setting means;
   memory means for storing information specific to each lens unit, supplied from the lens unit; and
   second control means for generating a command for controlling the value of said target value setting means in order to bring said diaphragm to a predetermined state, at the mounting of the lens unit, on the basis of a result of comparing a specific information of the mounted lens unit supplied from the lens unit with the content of said memory means.

2. A camera system according to claim 1, wherein said correction means is provided in said camera unit and includes manual operation means for manually changing said target control value.

3. A camera system according to claim 1, wherein said memory means stores a specific lens number stored in said lens unit.

4. A camera system according to claim 1, wherein said diaphragm drive means drives said diaphragm so as to make an output of said diaphragm state detection means equal to said target control value.

5. A camera system according to claim 4, wherein said first control means and said second control means are provided on camera unit side.

6. A camera system according to claim 1, further comprising:
   a communication line for communicating various information between said camera unit and said lens unit.

7. A camera system according to claim 6 wherein said diaphragm drive means drives said diaphragm so as to make an output of said diaphragm state detection means equal to said target control value.

8. A camera unit according to claim 4, wherein said first control means and said second control means are provided on camera unit side.

9. A camera system with interchangeable lens, consisting of a camera unit and a lens unit detachably mountable on said camera unit, comprising:
   target value setting means provided in said lens unit for setting a target diaphragm aperture value;
   correction means for generating a correction signal for increasing or decreasing the content of said target value setting means;
   memory means for storing an information relative to a state of said correction means;
   state detection means for detecting diaphragm information;
   first control means for varying the set value of said target value setting means, based on said correction signal;
   diaphragm drive means for driving said diaphragm based on the result of comparison of the output of said diaphragm state detection means and the value of said target value setting means; and
   second control means for generating a command for controlling the value of said target value setting means in order to bring said diaphragm to a predetermined state on the basis of information stored in said memory means when a change occurs in the state of power supply.

10. A camera system according to claim 9, wherein said correction means is provided in said camera unit and includes manual operation means for manually changing said target control value.

11. A camera system according to claim 9, further comprising:
   detachment detection means for detecting detachment of said lens unit; and
   means for changing the target value so as to make the aperture value equal to an operation value used in the camera unit for a prior lens unit when said lens unit is different from the prior lens unit.

12. A camera unit on which a lens unit is detachably mountable, comprising:
   first memory means for storing the state of a diaphragm in the lens unit;
   second memory means for storing lens information specific to the lens unit;
   comparator means for comparing, when the lens is detached and mounted, the lens information of a newly mounted lens unit with the content of said second memory means; and
   control means for generating a command for controlling said diaphragm to an aperture value stored in said first memory means in the case that the lens information of newly mounted lens unit is different from the content of said second memory means.

13. A camera unit according to claim 12, wherein said first memory means is provided in said camera unit and stores said aperture value.

14. A camera unit according to claim 13, wherein said second memory means stores a specific lens number stored in said lens unit.

15. A camera unit according to claim 14, wherein said comparator means controls said aperture value so as to make equal to the aperture value stored in said first memory means if the information of the detached lens unit, stored in said second memory means, is different from information specific to a newly mounted lens unit when the lens unit is detached, and controls the diaphragm by using the aperture value of the newly mounted lens unit as an initial value if the information of the detached lens unit is equal to the information of the newly mounted lens unit.

16. A camera unit according to claim 12, further comprising:

a communication line for communicating various information between said camera unit and said lens unit.

17. A camera with interchangeable lens, consisting of a camera unit and a lens unit detachably mountable on said camera unit, comprising:

communication means for transmitting a diaphragm aperture value from the lens unit to the camera unit;

memory means for storing said diaphragm aperture value before the lens unit is detached and mounted or before the power supply is turned off and then on, in said camera unit; and correction means for transmitting a correction signal to the lens unit for correcting the diaphragm aperture value of the lens unit to the aperture value stored in said memory means of said camera unit, in case the lens unit is detached and mounted or in case the power supply is turned off and then on.

18. A camera according to claim 17, wherein said communication means communicates various signals synchronizing with a vertical sync of a video signal.

19. A camera according to claim 17, further comprising: manual operation means provided in said camera unit, for changing the aperture value.

20. A camera according to claim 17, wherein said memory means stores the aperture value before the lens unit is detached or before the power supply is turned off or on.

21. A camera according to claim 20, wherein said correction means make said aperture value equal to the aperture value stored in said memory means if the lens unit is different from a prior detached lens unit when the prior lens unit is detached.

* * * * *

UNITED STATES PATENT AND TRADEMARK OFFICE
CERTIFICATE OF CORRECTION

PATENT NO. : 5,325,149
DATED : June 28, 1994
INVENTOR(S) : Hideo Kawahara

It is certified that error appears in the above-indentified patent and that said Letters Patent is hereby corrected as shown below:

Title Page:
[Item 57], line 12, after "cording" insert --to--

Col. 2, line 7, change "21" to --22--

Col. 4, line 6, after "3," insert --the--

Col. 4, line 8, after "by" insert --the--

Col. 4, line 10, after "not" insert --be--

Col. 4, line 28, after "is" insert --the--

Col. 4, line 53, after "is" insert --the--

Col. 7, line 5, delete "the" (second occurrence)

Signed and Sealed this

Twentieth Day of September, 1994

Attest:

BRUCE LEHMAN

Attesting Officer    Commissioner of Patents and Trademarks